United States Patent

Barber et al.

Patent Number: 6,088,435
Date of Patent: Jul. 11, 2000

[54] INTERACTIVE TELEPHONE NETWORKING SERVICE

[75] Inventors: James Stewart Barber, Oldwick; Chih Chiang Kung, Warren; Kalpesh P. Parekh, Morristown; Mona A. Yousry, Oldwick, all of N.J.

[73] Assignee: AT&T Corp., New York, N.Y.

[21] Appl. No.: 09/328,600

[22] Filed: Nov. 10, 1997

Related U.S. Application Data

[63] Continuation of application No. 08/355,382, Dec. 13, 1994, abandoned.

[51] Int. Cl.⁷ ........................................... H04M 3/42
[52] U.S. Cl. ........................ 379/205; 379/90.01; 379/201
[58] Field of Search .................... 379/88.22, 88.25, 379/90.01, 201, 202, 203, 204, 205, 206, 214, 216, 242, 243, 244, 245

[56] References Cited

U.S. PATENT DOCUMENTS

| | | | |
|---|---|---|---|
| 4,691,347 | 9/1987 | Stanley et al. | 379/203 |
| 4,812,843 | 3/1989 | Champion, III et al. | 340/905 |
| 4,910,766 | 3/1990 | Ogino et al. | 379/201 |
| 4,969,185 | 11/1990 | Dorst et al. | 379/209 |
| 4,979,206 | 12/1990 | Padden et al. | 379/67 |
| 5,086,394 | 2/1992 | Shapira | 364/419 |
| 5,151,782 | 9/1992 | Ferraro | 358/86 |
| 5,210,611 | 5/1993 | Yee et al. | 358/191.1 |
| 5,283,731 | 2/1994 | Lalonde et al. | 364/401 |
| 5,369,694 | 11/1994 | Bales et al. | 379/206 |
| 5,408,518 | 4/1995 | Yunoki | 379/67 |
| 5,428,778 | 6/1995 | Brookes | 395/600 |
| 5,457,738 | 10/1995 | Sylvan | 379/96 |
| 5,483,587 | 1/1996 | Hogan et al. | 379/202 |
| 5,483,588 | 1/1996 | Eaton et al. | 379/202 |
| 5,488,650 | 1/1996 | Greco et al. | 379/67 |
| 5,596,634 | 1/1997 | Fernandez et al. | 379/201 |

FOREIGN PATENT DOCUMENTS

| | | | |
|---|---|---|---|
| 0627837 | 12/1994 | European Pat. Off. | 379/142 |
| 2607340 | 5/1988 | France . | |
| WO 92/17021 | 3/1992 | WIPO . | |

OTHER PUBLICATIONS

Herb Friedman, "Communications Corner, Communications in the Computer Age", Radio–Electronics, pp. 98, 100, Nov. 1985.

*Primary Examiner*—Scott L. Weaver
*Attorney, Agent, or Firm*—Kenyon & Kenyon

[57] ABSTRACT

Methods and apparatus are disclosed for enabling parties with similar interests to speak with one another through connections automatically established by equipment within the telephone network. A party seeking to join a conversation or obtain information (referred to as a "requesting subscriber") is connected automatically with an appropriate individual, conference call, or voice messages on the basis of information provided by the requesting subscriber and information about other prospective parties to the call (other "subscribers" to the interactive telephone network service). The requesting subscriber need not know the identities or telephone numbers of the other subscribers. The identities and telephone numbers of the other subscribers are maintained in a database and may be held in secrecy. Similarly, a requesting subscriber may create or retrieve telephone messages stored in a database according to the subject matter of the message.

12 Claims, 5 Drawing Sheets

| |
|---|
| SUBSCRIBER IDENTIFIER — 52 |
| PIN — 54 |
| NAME — 56 |
| ADDRESS — 58 |
| PHONE NUMBER — 60 |
| AGE — 62 |
| GENDER — 64 |
| INTEREST #1 — 66 |
| PRE-ARRANGED MESSAGE DELIVERY — 81 |
| INTEREST #2 — 68 |
| NUMBER OF TIMES CALLED — 70 |
| BILLING PREFERENCE — 72 |
| INBOUND CALL INDICATOR — 74 |
| PRIVATE/ PUBLIC PREFERENCE — 76 |
| VIDEO INDICATOR — 78 |
| MISC. INFORMATION — 80 |

INTERACTIVE TELEPHONE NETWORKING SERVICE

This application is a continuation of application Ser. No. 08/355,382, filed on Dec. 13, 1994 now abandoned.

BACKGROUND OF THE INVENTION

There are several arrangements known in the art for storing voice messages to be delivered from one person to another. Also, it is well known how to establish a telephone call between two or more parties to a call. In all cases, however, the caller must know the identity or the telephone number of a party to be called. For example, a conference call can be established by dialing the telephone numbers of two different prospective participants to the call and then bridging the calls to establish the conference call. Alternatively, several participants may decide in advance to establish a conference call and agree to call into a telephone bridge facility to establish the conference call. In the messaging context, a caller can leave a message for a called party that is busy or does not answer.

None of the existing techniques address the possibility of establishing calls between parties who have a similar interest but do not know the identity or telephone number of the other party.

SUMMARY OF THE INVENTION

In accordance with the principles of the invention, parties with similar interests can speak with one another through connections automatically established by equipment within the telephone network. A party seeking to join a conversation or obtain information (referred to as a "requesting subscriber") is connected automatically with an appropriate individual, conference call, or voice messages on the basis of information provided by the requesting subscriber and information about other prospective parties to the call (other "subscribers" to the interactive telephone network service). The requesting subscriber need not know the identities or telephone numbers of the other subscribers. The identities and telephone numbers of the other subscribers are maintained in a database and may be maintained in secrecy. Similarly, a requesting subscriber may create or retrieve telephone messages stored in a database according to the subject matter of the message.

In an exemplary embodiment of the invention, a record is stored within a database in the network for each subscriber of the interactive telephone networking service. The record includes personal information about the subscriber and one or more subject matter interests (e.g., history, football, woodworking, etc.) of the subscriber. The subject matter interests specified in the record are used to match (and subsequently connect by telephone) the subscriber with a requesting subscriber having similar interests.

BRIEF DESCRIPTION OF THE DRAWINGS

In the drawings:

FIG. 2 is a diagram of an exemplary format for a database record in accordance with the principles of the invention;

DETAILED DESCRIPTION

Figure 1:
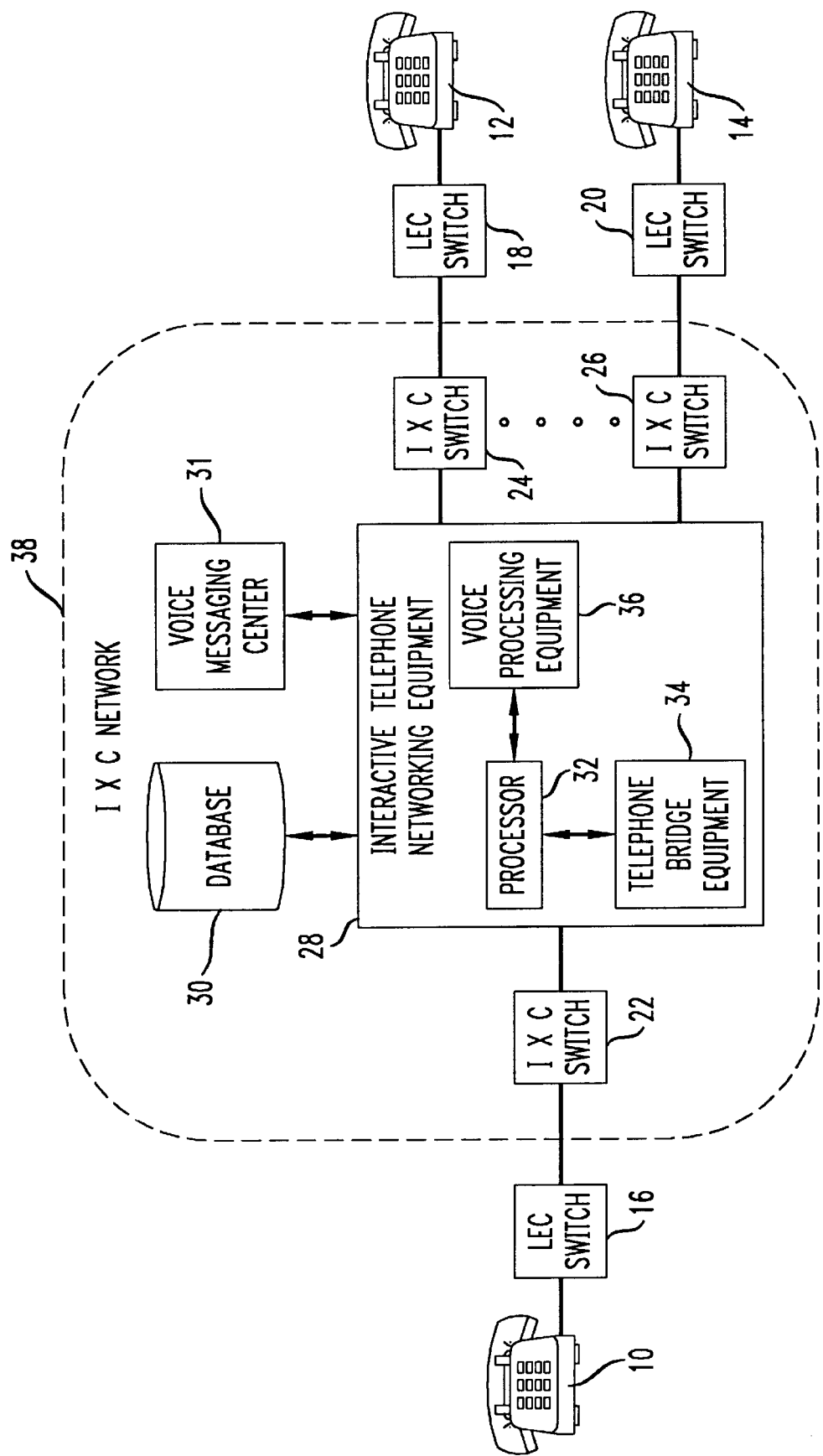
FIG. 1 is a simplified block diagram of a portion of a telecommunications network suitable for processing telephone calls in accordance with the principles of the invention.

FIG. 1 shows a telecommunications network in which a subscriber at a telephone station 10 can be connected with one or more other participants to a telephone call, illustratively subscribers at telephone stations 12 and 14, on the basis of the parties' interests. The network includes local exchange carrier (LEC) switches 16, 18, and 20, interexchange carrier (IXC) switches 22, 24, and 26, interactive telephone networking equipment 28, a database 30, and a voice messaging center 31. The IXC switches and the LEC switches illustratively are 4ESS™ and 5ESS® switches (though other switches could be used), respectively, and are commercially available from AT&T Corp. Interactive telephone networking equipment 28 includes a processor 32, telephone bridge equipment 34, and voice processing equipment 36. Telephone bridge equipment 34 may be implemented using bridge hardware commercially available from Ovation Corp. or Centigram Corp. Voice processing equipment 36 illustratively comprises Conversant® speech processing equipment available from AT&T. Although interactive telephone networking equipment 28 is shown and described as being disposed within IXC network 38, one skilled in the art will readily appreciate that the interactive telephone networking equipment could be implemented in other parts of a telecommunications network, such as within an LEC network.

Processor 32 performs several important functions. Processor 32 creates and modifies records that are stored within database 30 to define a subscriber's profile. The processor also performs a security function of ensuring that only authorized callers (e.g., a subscriber and his or her designees) are allowed to access the facilities of interactive telephone networking equipment 28. Processor 32 interacts with telephone bridge equipment 34 to establish and terminate conference calls. Processor 32 also interacts with voice messaging center 31 to enable the subscriber to leave or retrieve messages. Processor 32 may be implemented using any convenient processor which can perform these functions. One example of suitable equipment is a network control point commercially available from AT&T Corp.

FIG. 2 shows an exemplary subscriber record 50 that is stored within database 30. Each subscriber has his or her own record. Record 50 includes several fields which contain different types information. Generally, the information and the types of fields within record 50 can be categorized into one of the following three categories: personal information, subscriber profile information, and subscriber preference information. Personal information includes information about the subscriber that is used by the network to set up calls and verify the subscriber's identity. Subscriber profile information is information that is used by the network to match the subscriber with requests originated by other subscribers. Subscriber preference information relates to the subscriber's preferences for billing, willingness to accept calls from other subscribers, and the like.

The personal information portion of the subscriber record includes information used to identify the subscriber, authenticate the subscriber's identity, bill the subscriber for services, and establish calls to the subscriber from a requesting subscriber. This information is maintained in secrecy within a database in the network. Record 50 includes a subscriber identifier that is stored within a subscriber identifier field 52 and uniquely associates a particular record with a given subscriber. The subscriber identifier could be any convenient identifier, such as a string of alphanumeric characters or the automatic number identifier (ANI) of the subscriber's home telephone. Record 50 also includes a personal identification number (PIN) stored within a PIN field 54. Processor 32 compares the PIN stored in the record with information provided by a subscriber during call set-up to authenticate the subscriber's identity. Record 50 includes one or more fields which store information such as the subscriber's name (field 56) and address (field 58), and a telephone number field 60 which stores the telephone number at which the subscriber can be reached.

The subscriber profile information portion of record 50 includes information about the subscriber's interests, hobbies, and personal characteristics. For example, fields 62 and 64 store the subscriber's age and gender, respectively. Record 50 also includes one or more fields (e.g., fields 66 and 68) which store the subscriber's subject matter interests. These interests could include, for example, hobbies, favorite sports, areas of business or technical expertise, religion, politics, etc. The subscriber profile information typically may be made known to a requesting subscriber when a connection is made. However, the subscriber profile information can be maintained in a read-only format and not released to requesting subscribers.

As described in greater detail below, the subscriber profile information is used in at least two different ways. First, the profile information is used to identify a particular subscriber as meeting the criteria specified in a request from a requesting subscriber, so that a call can be established between the subscriber and the requesting subscriber. Second, the profile information is used to provide the subscriber with copies of voice messages pertaining to subjects listed in the subscribers profile.

The subscriber preference information portion of record 50 includes several fields which store information to facilitate management of the database and billing for calls. A field 70 may be provided to indicate how many times the subscriber has called for this service. A billing information field 72 stores the subscriber's billing preferences. This field may store, for example, an indication of whether the subscriber is to be billed on a flat rate basis, an hourly rate basis, or a per-call basis. An inbound call indicator 74 is provided to store an indication of whether the subscriber will accept calls from other subscribers (referred to as "inbound" calls). A field 76 is provided to indicate whether the subscriber is willing to be conferenced into a larger conversation among multiple subscribers or whether the subscriber prefers to have a private conversation with a single, other subscriber. A video indicator field 78 provides an indication of whether the subscriber would prefer a video conference call if the parties to the call have video capability. Finally, one or more additional miscellaneous fields 80 may be provided to store additional information useful for processing the call.

Figures 3, 5:
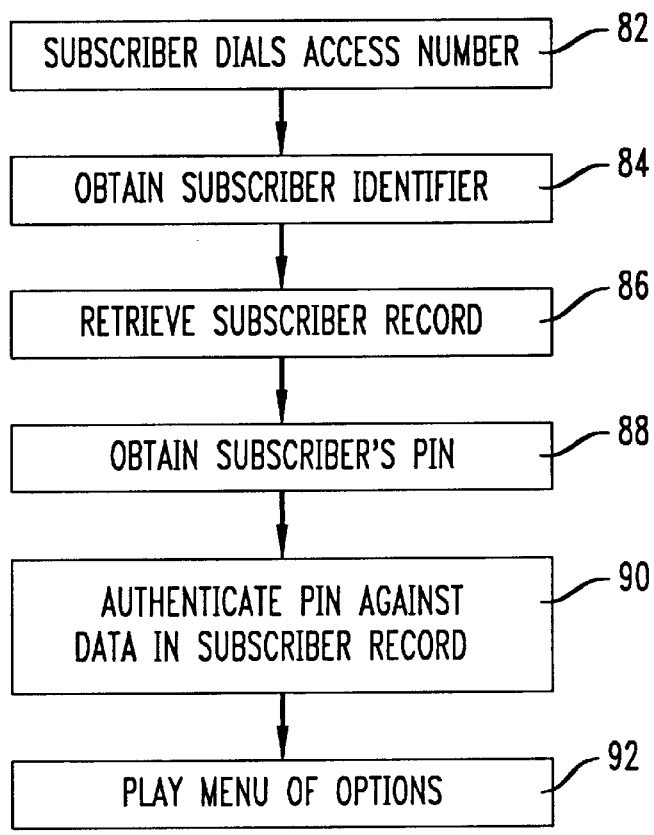
FIG. 3 is a flowchart of an illustrative process for accessing the interactive telephone networking service of the present invention.
FIG. 5 is an exemplary table for maintaining the status of subscribers to the interactive telephone networking service of the present invention.

FIG. 3 shows a flowchart for the initial processing of calls in accordance with the principles of the invention. A subscriber at telephone station 10 of FIG. 1 dials an access number, such as a toll-free "800 number" or a so-called "900 number," to access the interactive telephone networking system (as indicated on FIG. 3 by box 82). The call is extended from LEC switch 16 to IXC switch 22. IXC switch 22 performs a number translation in a conventional manner to convert the dialed access number into a telephone number for routing the call to interactive telephone networking equipment 28. Voice processing equipment 36, under the control of processor 32, requests the subscriber to enter a subscriber identifier (box 84). The subscriber specifies the identifier by entering dual tone multifrequency (DTMF) digits from the telephone keypad or by speaking the identifier which is recognized by voice processing equipment 36. Processor 32 uses the subscriber identifier captured by voice processing equipment 36 to retrieve a subscriber record (e.g., record 50 of FIG. 2) from database 30 (box 86). Processor 32 stores the record in a temporary memory associated with the processor. Assuming a subscriber record is found, the subscriber is then requested to enter a PIN (box 88). The subscriber-specified PIN is compared with the PIN stored in the subscriber record to authenticate the subscriber's identity and determine whether to continue processing the call (box 90). The subscriber may enter the PIN by keying selected DTMF digits from a telephone keypad. Alternatively, the subscriber may speak the PIN, which is recognized using conventional speech recognition (speaker independent) or voice recognition (speaker dependent) techniques.

Once the system has identified the subscriber and verified the subscriber's authority to use the system, the subscriber can use the features of the interactive telephone networking service through a multi-level menu arrangement (box 92 of FIG. 3). The menu comprises different tiers represented as instructions stored in processor 32. The menu is communicated to the subscriber, and menu selections are received from the subscriber through the use of voice processing equipment 36 under control of processor 32. The subscriber is given the option of (1) participating in a conversation with other subscribers, (2) accessing a database to create or retrieve messages, or (3) modifying the subscriber's record. Each of these options will be described in turn.

Figure 4:
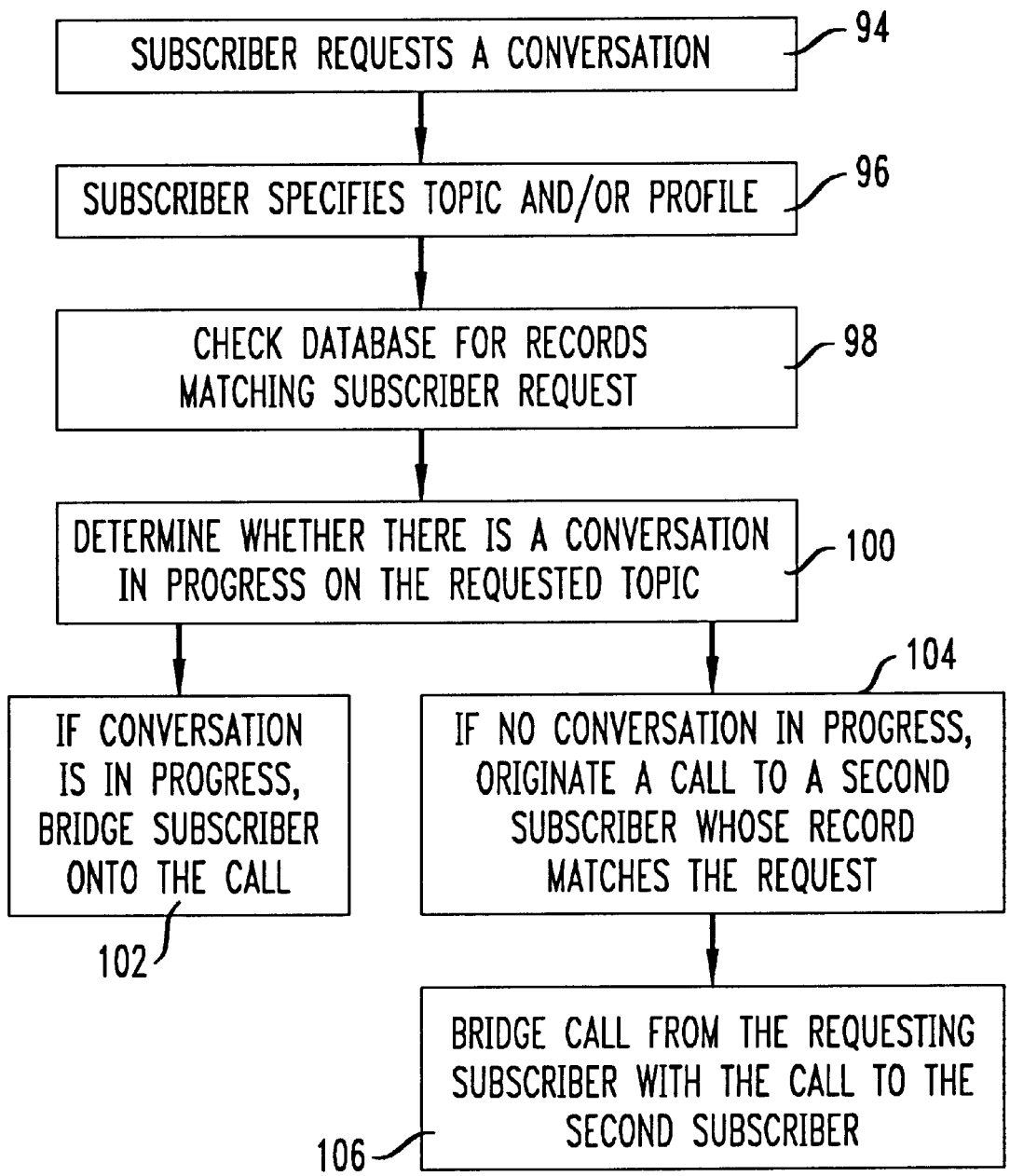
FIG. 4 is a flowchart of an illustrative process for setting up a call between subscribers in accordance with the principles of the invention.

FIG. 4 illustrates exemplary processing for establishing a connection between a requesting subscriber and other subscribers. The requesting subscriber selects the appropriate menu option to request a conversation (box 94). The requesting subscriber is then asked to specify the profile of a person with whom the subscriber wishes to speak (box 96). Processor 32 receives the desired profile characteristics via voice processing equipment 36 and compares those profile characteristics with the subscriber profile information in the records in database 30 to identify a list of prospective parties to a telephone call (box 98). When a match is found with one or more records in database 30, processor 32 determines whether any of the subscribers identified by matching records are currently active on the network (box 100). (One suitable method for determining the active/inactive status of a subscriber is described below with respect to FIG. 5.) If so, processor 32 bridges the requesting subscriber onto the call with the second subscriber (box 102). If matching records are found but none of the subscribers associated with those records are currently using the facilities of interactive telephone networking equipment 28, processor 32 will cause telephone bridge equipment 34 to dial the telephone number of a selected subscriber who matches the requested profile (box 104). Telephone bridge equipment 34 then bridges the calls to connect the requesting subscriber with the selected subscriber (box 106).

Processor 32 may maintain a table which records the status of each subscriber. FIG. 5 shows one example of such a table. The table of FIG. 5 includes three columns 108, 110, and 112 which respectively store the subscriber identifier, an indication of the status of a subscriber, and, in certain circumstances, the subject matter of the subscriber's current conversation. The status of each subscriber identifier is identified as one of three different states: "conversation," "data acquisition," or "inactive." The "conversation" state signifies that the subscriber associated with the subscriber identifier specified in column 108 is currently engaged in a conversation with one or more other subscribers. An indication of conversation state in column 110 preferably is accompanied by an indication in column 112 of the subject matter of the conversation. This subject matter indication is useful to prevent joining a requesting subscriber on a conversation with a subscriber that meets the requesting subscriber's subject matter and/or profile criteria, but happens to be discussing a different subject at the present time. An indication of "data acquisition" status in column 110 indicates that the subscriber is communicating with voice messaging center 31 to create or receive a voice message. An indication of "inactive" status in column 110 indicates that the subscriber associated with the subscriber identifier in column 108 is not currently using the interactive telephone networking system. If an "inactive" subscriber's profile information matches a requesting subscriber's requested profile characteristics, processor 32 examines the records to determine whether the identified subscribers have indicated (via inbound call indicator 74 of record 50) a willingness to accept inbound telephone calls. If so, processor 32 will access the subscriber's record to obtain the subscriber's telephone number from field 60 so that a call can be made to enable the requesting subscriber to speak with the selected subscriber.

Where a requesting subscriber wishes to talk with a person about a specific subject, the requesting subscriber specifies the subject to be discussed. The requesting subscriber also may specify an age, gender, or other profile restriction. Processor 32 searches the database within voice messaging center 31 for messages pertaining to the subject matter specified by the requesting subscriber and, if any such messages are found, processor 32 determines the author of each message. The processor then checks the subscriber records within database 30 to determine whether the authors of messages meeting the criteria are willing to accept telephone calls regarding the subject of the message (and perhaps whether the authors meet the specified age, gender, or other profile restriction). When the requisite criteria are met, processor 32 causes telephone bridge equipment 34 to outdial to the appropriate author (subscriber) and bridges the call with the requesting subscriber.

The following examples will help to illustrate the operation of the system in the context of establishing a conversation between a requesting subscriber and another subscriber. As a first example, assume that a requesting subscriber is interested in purchasing a gift for a person and needs advice as to an appropriate gift for a particular occasion. The requesting subscriber can access the interactive system and request a conversation with another subscriber who matches the profile (e.g., age, gender, or particular hobby) of the person who will receive the gift. The system could then automatically connect the requesting subscriber with another appropriate subscriber so that the requesting subscriber can ask for gift ideas. The requesting subscriber does not need to know the identity or telephone number of the subscriber to be called. As another example, assume that the requesting subscriber wishes to find out about a particular movie. The requesting subscriber may specify the name of the movie (the subject matter to be discussed) and specify a profile (age, gender) which matches that of the requesting subscriber. Processor 32 could perform a lookup in voice messaging center 31 for messages left about the movie and determine the author (another subscriber of the interactive telephone networking service) of each message. Processor 32 then looks up the authors' records in database 30 to determine whether any of the authors fit the specified profile and whether the author will accept inbound telephone calls. If all conditions are met, telephone bridge equipment 34 completes a call to the author and bridges the with the requesting subscriber, thereby enabling the requesting subscriber to converse with someone with the specified profile.

The call connection method shown in FIG. 4 may be used in a variety of applications. For example, a person watching a "home shopping" program on television may use the call connection service of the present invention to discuss prospective purchases with others. All the person would have to do is to call a telephone number shown on the television screen to have someone, the right person, help make the purchasing decision. The caller may have a choice of speaking with either someone who has already purchased the product or someone who is considering buying the product. Other examples of situations in which the call connection service of the invention would be useful include creating a support group, starting a club to exchange ideas, locating goods and services, obtaining assistance in solving problems, and obtaining reviews of books and movies.

Figure 6:
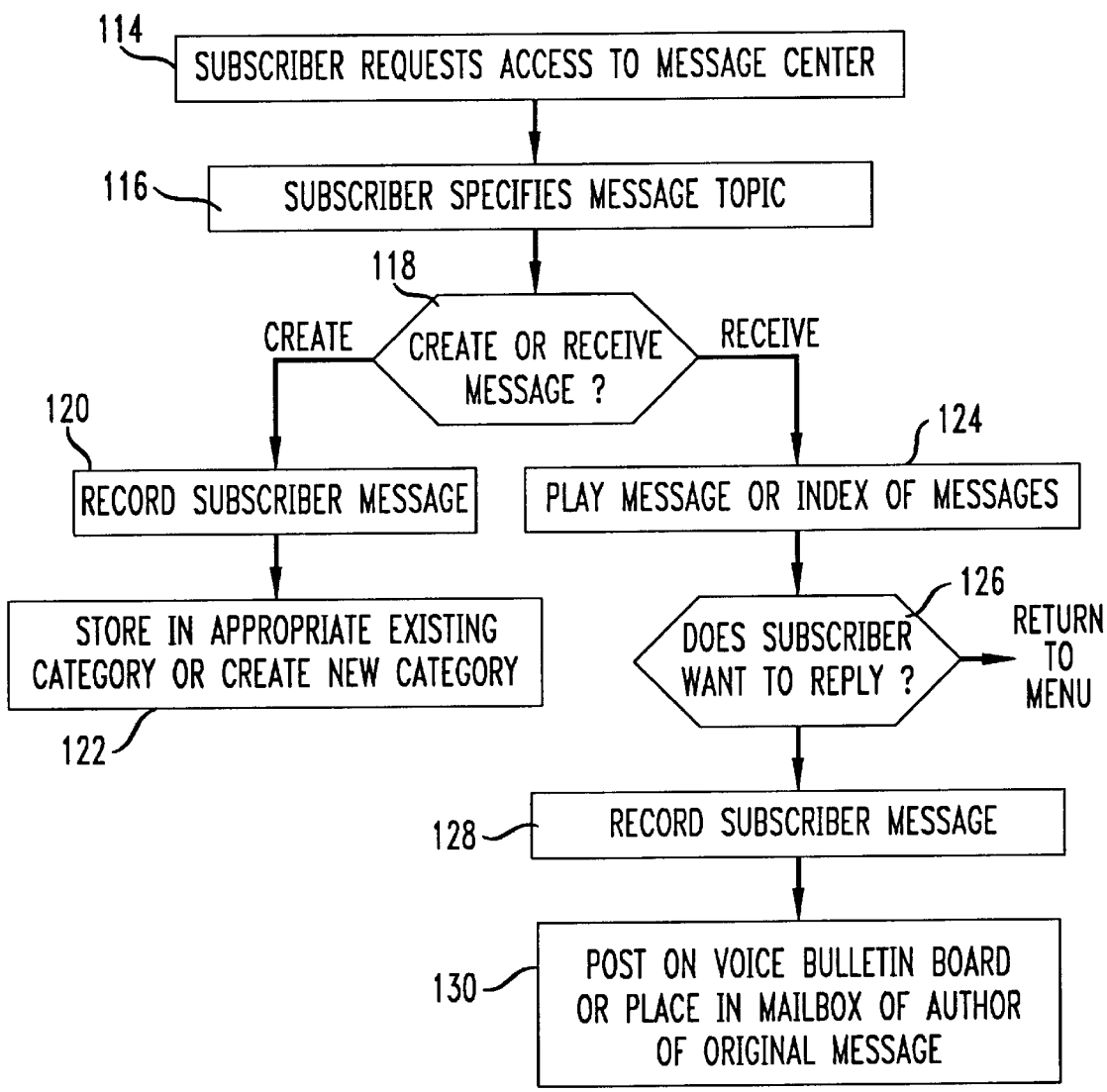
FIG. 6 is a flowchart of an illustrative process for creating and receiving messages in accordance with the principles of the invention.

As mentioned above, a second option available to the requesting subscriber from the main menu of options is to access voice messaging center 31. Voice messaging will be described with reference to FIG. 6. After the subscriber selects this option (box 114 of FIG. 6), processor 32 causes voice processing equipment 36 to ask the subscriber to specify a message topic or subject matter (box 116). The subscriber is then asked whether the subscriber will create a message or receive a message (box 118). If the subscriber elects to create a message, the subscriber leaves a message in voice messaging center 31 in a conventional manner (box 120). Techniques for recording voice messages are well known in the art and are disclosed, for example, in U.S. Pat. No. 4,932,048 issued Jun. 5, 1990 to Baral et al., which is hereby incorporated by reference. If the subscriber's message belongs to a category which already exists, the message is stored in (e.g., labeled as belonging to) the appropriate category. Otherwise, a new category of messages may be added (box 122).

Where a subscriber elects to receive a message on a subscriber-specified topic, processor 32 plays a message or a list of available messages (box 124). In accordance with an aspect of the invention, the subscriber also may specify a profile of characteristics such that the messages played to the subscriber are those created by authors who meet the specified profile. For example, the subscriber may wish to obtain information about travel in Europe, but only from people in the 18 to 25 years old age group. If messages exist which meet the specified topic and author profile, the subscriber is informed of the number of messages available, preferably together with a brief summary of the message. The subscriber is then asked for instructions for playing messages (e.g., play, skip, or save message). If the category does not exist, or no one in the specified profile has left a message in the requested category, the subscriber is so informed and preferably is given an opportunity to revise the topic and author profile selection.

In another exemplary embodiment of the invention, subscriber can pre-arrange to receive automatically all voice mail messages on a selected topic which are posted to a "voice bulletin board" by other subscribers. (The subscriber may restrict delivery to those messages from authors matching a selected profile of characteristics.) At the subscriber's leisure, the subscriber may listen to the messages, delete messages, or respond to the messages. Pre-arranging to receive messages can be accomplished by providing a field 81 in subscriber record 50 which instructs processor 32 to automatically send messages on a selected interest, such as the interest of interest field 66, to a voice "mailbox" associated with the subscriber.

A subscriber who receives voice messages as described above can respond to a message. Referring again to FIG. 6, the subscriber may be prompted for instructions as to whether the subscriber will leave a reply message (box 126). If the subscriber wishes to leave a message, the message is recorded for subsequent delivery (box 128). The subscriber may choose to respond by leaving a "public" response message, or by leaving a "private" response message. More particularly, the subscriber may post the subscriber's own response message on the bulletin board, or may specify that the subscriber's response message is to be delivered only to the author of a particular message, such as the author of the message most recently retrieved by the subscriber (box 130). In addition, the subscriber may instruct processor 32 to initiate a telephone call to the author of a particular message. Processor 32 would then access the author's subscriber record (stored in database 30) to determine whether that author is willing to receive inbound calls (as indicated in field 74 of record 50). If the author is willing to receive calls, processor 32 causes telephone bridge equipment 34 to dial the author's telephone number (obtained from record 50) and bridge the author with the subscriber.

A third option available to the subscriber from the main menu of options is to modify the subscriber's record. In this regard, the subscriber may change the subscriber's personal information (e.g., home address), profile information (e.g., add or delete hobby/subjects of interest), and subscriber preference information (e.g., billing preferences). Changes to the subscriber's record are made by interacting with voice processing equipment 36 in a conventional manner. A "review" function, which recites the subscriber's current selections, preferably is provided to facilitate updating and revising the subscriber records.

Bridge hardware 34 preferably generates a signal, such as an audible tone, as additional participants are added to a conference call. Processor 32 could cause voice processing hardware 40 to generate an announcement identifying the subscriber joining the call—even if by using an alias. An additional field could be provided in record 50 to store a label specified by the subscriber which could be used to identify the subscriber to other conference call participants when the subscriber joins a conference call.

One skilled in the art will readily appreciate that the system could be modified in various ways without departing from the scope of the invention. For example, the system could be modified to enable the subscriber to retain contact with processor 32, and be provided with access to the main menu, at the end of each call with other subscribers. This provides the subscriber with an opportunity to initiate a second call to another subscriber or to access a bulletin board while eliminating the need for the subscriber to redial the 800 access number and to re-enter the subscriber identifier and PIN. The subscriber simply remains on the line after all other participants have disconnected from the bridge, or enters a predetermined sequence of DTMF signals recognized by telephone bridge equipment 34 as a command to return the subscriber to the main menu.

What is claimed is:

1. A method for processing a call in a network comprising the steps of:

receiving from a subscriber a request to establish a telephone connection with another party on a topic specified by the subscriber;

comparing the subscriber-specified topic with information stored in a database for other subscribers to identify a prospective party to the telephone connection;

determining whether the prospective party is actively connected to the network; and based on the determination, automatically initiating the telephone connection between at least the subscriber and the prospective party.

2. The method of claim 1 wherein the information stored in the database comprises a subscriber profile for each of a plurality of subscribers, each subscriber profile comprising:

information about a selected subscriber's identity;

the selected subscriber's telephone number; and at least one subject matter identifier, the subject matter identifier being indicative of subject matter topics of interest to the selected subscriber.

3. The method of claim 2 wherein the subscriber profile further comprises an indication of whether the selected subscriber will accept in-bound telephone calls.

4. The method of claim 2 wherein the subscriber profile further comprises an indication of whether the selected subscriber has video telephone capability.

5. The method of claim 1 wherein the step of automatically initiating the telephone connection comprises bridging the subscriber onto an existing telephone call if it is determined that the prospective party is active.

6. The method of claim 1 wherein the step of automatically initiating the telephone connection comprises initiating the telephone connection to a second subscriber using a telephone number obtained from the database if it is determined that the prospective party is inactive.

7. The method of claim 1 wherein the request further specifies at least one personal characteristic of the prospective party to the telephone connection.

8. A method for processing a call in a network comprising the steps of:

receiving from a subscriber a request to establish a telephone connection with another party, the request including profile information specifying at least one personal characteristic of the other party;

comparing the profile information provided in the request with information stored in a database for other subscribers to identify a prospective party to the telephone connection;

determining whether the prospective party is actively connected to the network; and based on the determination, automatically initiating the telephone connection between at least the subscriber and the prospective party.

9. The method of claim 8 wherein the personal characteristic comprises an indication of the subscriber's preference for the age of the other party.

10. The method of claim 8 wherein the personal characteristic comprises an indication of the subscriber's preference for the gender of the other party.

11. The method of claim 8 wherein the step of automatically initiating the telephone connection comprises bridging the subscriber onto an existing telephone call if it is determined that the prospective party is active.

12. The method of claim 8 wherein the step of automatically initiating the telephone connection comprises initiating the telephone connection to a second subscriber using a telephone number obtained from the database if it is determined that the prospective party is inactive.

* * * * *